US012606020B2

(12) United States Patent
Zeng et al.

(10) Patent No.: US 12,606,020 B2
(45) Date of Patent: Apr. 21, 2026

(54) AUTOMOTIVE DECORATIVE PANEL

(71) Applicant: TPK Touch Solutions (Xiamen) Inc., Fujian (CN)

(72) Inventors: Ding Gui Zeng, Xiamen City (CN); Le Le Su, Biyang County (CN); Chung Chieh Wu, Changhua County (TW); Yun Chien Lo, Taipei City (TW); Chun Yong Zhang, Xiamen City (CN); Tai-Shih Cheng, Taipei City (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 404 days.

(21) Appl. No.: 18/296,473

(22) Filed: Apr. 6, 2023

(65) Prior Publication Data

US 2024/0336210 A1     Oct. 10, 2024

(51) Int. Cl.
| *B60K 35/10* | (2024.01) |
| *B60R 13/02* | (2006.01) |
| *B60R 13/04* | (2006.01) |

(52) U.S. Cl.
CPC .......... *B60K 35/10* (2024.01); *B60R 13/0262* (2013.01); *B60R 13/04* (2013.01); *B60R 2013/0287* (2013.01)

(58) Field of Classification Search
CPC . B60K 35/00; B60R 13/04; B60R 2013/0287; B60R 13/0262
See application file for complete search history.

(56) References Cited

U.S. PATENT DOCUMENTS

| 2015/0001838 A1* | 1/2015 | Moroz .................... B60R 13/04 |
| | | 280/770 |
| 2022/0161741 A1* | 5/2022 | Beau ..................... H05K 1/0366 |
| 2022/0365386 A1* | 11/2022 | Cuvillier ............. G02B 6/0055 |

FOREIGN PATENT DOCUMENTS

DE         102018113449 A1 * 12/2019   ............... H05B 3/34

* cited by examiner

*Primary Examiner* — Dany E Akakpo
(74) *Attorney, Agent, or Firm* — Cooper Legal Group, LLC

(57)          ABSTRACT

An automotive decorative panel includes a decorative film, a touch icon component, and a light source system. The decorative film has an optical density between 0.2 and 2.0 and includes a substrate and a decorative layer disposed on the substrate. The touch icon component is disposed under the decorative film and includes a light-shielding pattern layer having an optical density between 3.5 and 6.0, a light diffusion layer disposed under the light-shielding pattern layer, and a touch layer. The light-shielding pattern layer has a pattern area that is light-permeable and a peripheral area that is light-impermeable. The touch layer is disposed on a side of the light-shielding pattern layer or between the decorative film and the light-shielding pattern layer. The light source system is disposed on a side of the touch icon component and configured to emit light toward the touch icon component.

20 Claims, 6 Drawing Sheets

110

100

AUTOMOTIVE DECORATIVE PANEL

BACKGROUND

Technical Field

The present disclosure relates to an automotive decorative panel.

Description of Related Art

At present, most traditional car interiors use physical mechanical buttons. These buttons are highly reliable and highly tolerant to environmental changes (such as temperature). However, these buttons must be protruding objects in the interior space of the car. These buttons are not only unattractive and insufficient in integrity, but also lose operability and service life due to the problem of jamming or internal corrosion after a long period of use.

Accordingly, how to provide an automotive decorative panel to solve the aforementioned problems has become an important issue to be solved by those in the industry.

SUMMARY

An aspect of the disclosure is to provide an automotive decorative panel that can efficiently solve the aforementioned problems.

According to an embodiment of the disclosure, an automotive decorative panel includes a decorative film, a touch icon component, and a light source system. The decorative film includes a substrate and a decorative layer disposed on the substrate. The decorative film has an optical density between 0.2 and 2.0. The touch icon component is disposed under the decorative film and includes a light-shielding pattern layer, a light diffusion layer, and a touch layer. The light-shielding pattern layer has an optical density between 3.5 and 6.0. The light-shielding pattern layer has a pattern area that is light-permeable and a peripheral area that surrounds the pattern area and is light-impermeable. The light diffusion layer is disposed under the light-shielding pattern layer and has a thickness between 10 μm and 30 μm. A spacing between the light diffusion layer and the light-shielding pattern layer is between 0 and 1.0 mm. The touch layer is disposed on a side of the light-shielding pattern layer away from the decorative film or between the decorative film and the light-shielding pattern layer. The light source system is disposed on a side of the touch icon component away from the decorative film and configured to emit light toward the touch icon component.

In an embodiment of the disclosure, the light source system has a luminous intensity between 22.5 cd/m² and 1000 cd/m².

In an embodiment of the disclosure, the substrate has a thickness smaller than 250 μm.

In an embodiment of the disclosure, the light-shielding pattern layer has a thickness between 8 μm and 30 μm.

In an embodiment of the disclosure, the pattern area has a width between 0.15 mm and 5 mm.

In an embodiment of the disclosure, the automotive decorative panel further includes a flexible circuit board. The flexible circuit board is connected to the touch layer and the light source system.

In an embodiment of the disclosure, the light-shielding pattern layer is a printing ink layer.

In an embodiment of the disclosure, a material of the touch layer includes conductive polymer.

In an embodiment of the disclosure, the conductive polymer is poly(3,4-ethylenedioxythiophene) polystyrene sulfonate (PEDOT:PSS).

In an embodiment of the disclosure, the automotive decorative panel further includes a supporting layer. The supporting layer is disposed between the decorative film and the touch icon component.

Accordingly, in the automotive decorative panel of the present disclosure, by making the optical density of the decorative film fall within a predetermined range, sufficient shielding and light-transmitting properties of the automotive decorative panel can be ensured. By making the optical density of the light-shielding pattern layer of the touch icon component greater than the optical density of the decorative film, it is possible to ensure sufficient clarity of the icons presented on the automotive decorative panel. By making the light diffusion layer of the touch icon component have a predetermined thickness and maintaining a predetermined spacing between the light diffusion layer and the light-shielding pattern layer, an excellent balance can be achieved between the light diffusion effect and icon definition.

It is to be understood that both the foregoing general description and the following detailed description are by examples and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
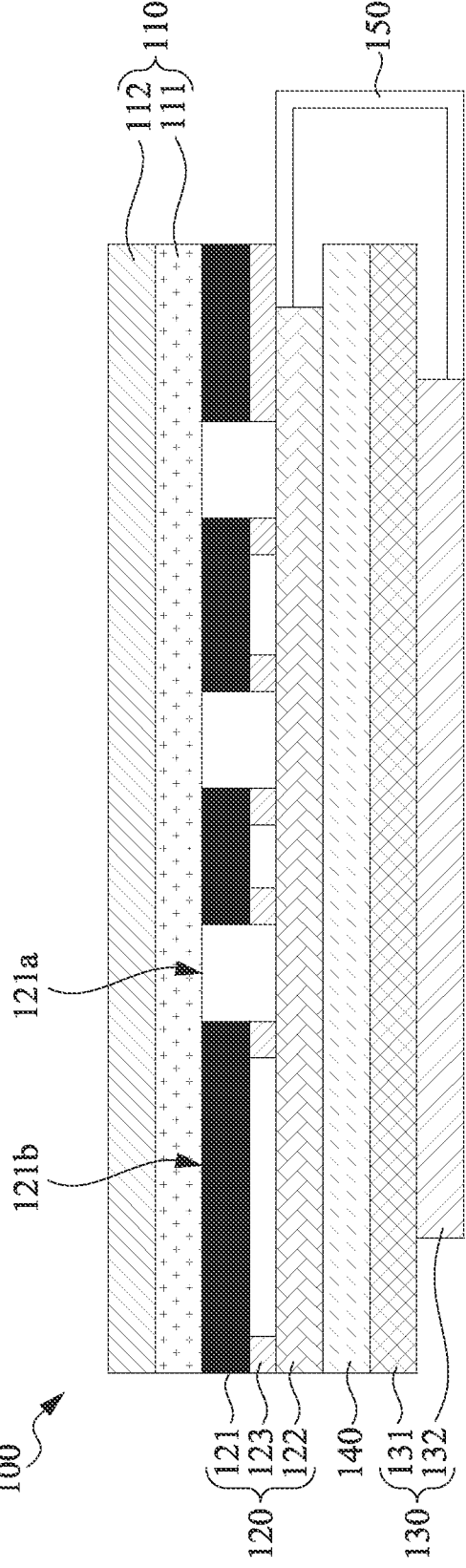
FIG. 1 is a cross-sectional view of an automotive decorative panel according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
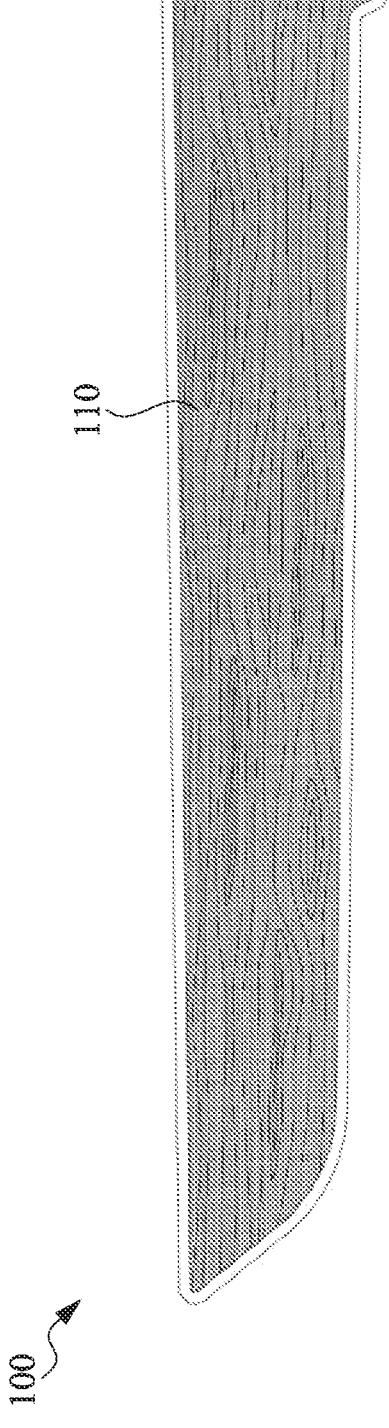
FIG. 2 is a front view of the automotive decorative panel according to an embodiment of the present disclosure, in which a light source system is not activated.
Figure 3:
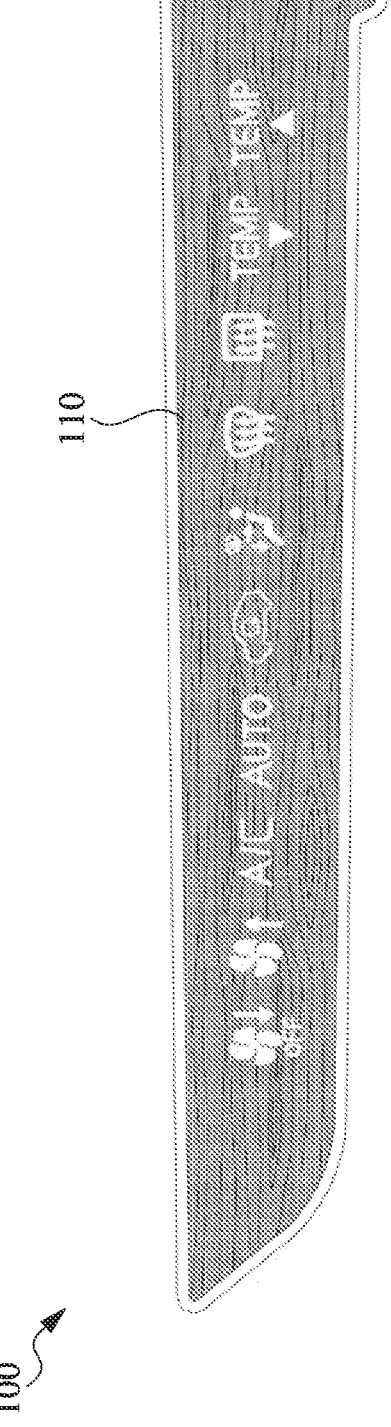
FIG. 3 is another front view of the automotive decorative panel in FIG. 2, in which the light source system is activated.

Reference is made to FIG. 1, FIG. 2, and FIG. 3. FIG. 1 is a cross-sectional view of an automotive decorative panel 100 according to an embodiment of the present disclosure. FIG. 2 is a front view of the automotive decorative panel 100 according to an embodiment of the present disclosure, in which a light source system 130 is not activated. FIG. 3 is another front view of the automotive decorative panel 100 in FIG. 2, in which the light source system 130 is activated. As shown in FIGS. 1 to 3, in the present embodiment, the automotive decorative panel 100 includes a decorative film 110, a touch icon component 120, and a light source system 130. The decorative film 110 includes a substrate 111 and a decorative layer 112 disposed on the substrate 111. The touch icon component 120 is disposed under the decorative film 110 and includes a light-shielding pattern layer 121, a light diffusion layer 122, and a touch layer 123. The light-shielding pattern layer 121 has a pattern area 121a that is light-permeable and a peripheral area 121b that surrounds the pattern area 121a and is light-impermeable. The light diffusion layer 122 is disposed under the light-shielding pattern layer 121. The touch layer 123 is disposed on a side of the light-shielding pattern layer 121 away from the decorative film 110 and is between the light-shielding pattern layer 121 and light diffusion layer 122. The light source system 130 is disposed on a side of the touch icon component 120 away from the decorative film 110 and configured to emit light toward the touch icon component 120. In this way, when the light source system 130 is not activated, no icon can be seen from the front view of the automotive decorative panel 100, as shown in FIG. 2. On the contrary, when the light source system 130 is activated, icons can be seen from the front view of the automotive decorative panel 100, as shown in FIG. 3.

In some embodiments, as shown in FIGS. 2 and 3, the decorative layer 112 presents the appearance of wood grain, but the disclosure is not limited in this regard.

In some embodiments, a material of the substrate 111 of the decorative film 110 includes plastic. The plastic includes, for example, polyethylene terephthalate (PET), but the present disclosure is not limited in this regard.

In some embodiments, in terms of design options, the decorative film 110 has an optical density between 0.2 and 2.0. If the optical density of the decorative film 110 is smaller than 0.2, the shielding property of the decorative film 110 will be insufficient, that is, the user can see the components behind the decorative film 110. If the optical density of the decorative film 110 is greater than 2.0, the light-transmitting property of the decorative film 110 will be insufficient, that is, the icons in FIG. 3 may not be displayed clearly. From this we can see that, by making the optical density of the decorative film 110 fall within the aforementioned predetermined range, it is possible to ensure that the automotive decorative panel 100 has sufficient shielding and light-transmitting properties, which shows advantages in design.

In some embodiments, in terms of design options, the light-shielding pattern layer 120 has an optical density between 3.5 and 6.0. By making the optical density of the light-shielding pattern layer 121 greater than the optical density of the decorative film 110, it is possible to ensure sufficient clarity of the icons presented on the automotive decorative panel 100, which shows advantages in design.

In some embodiments, the light diffusion layer 122 of the touch icon component 120 has a thickness between 10 μm and 30 μm. In addition, a spacing between the light diffusion layer 122 and the light-shielding pattern layer 121 of the touch icon component 120 is between 0 and 1.0 mm. In terms of design options, if the thickness of the light diffusion layer 122 is smaller than 10 μm, the light diffusion effect of the light diffusion layer 122 is poor. If the thickness of the light diffusion layer 122 is greater than 30 μm, the light transmittance of the light diffusion layer 122 will be reduced, thereby reducing the display brightness of the automotive decorative panel 100. If the light diffusion layer 122 is not close enough to the light-shielding pattern layer 121, the light may be scattered and the clarity of the icons cannot be ensured. From this we can see that, by making the light diffusion layer 122 have the aforementioned predetermined thickness and maintaining the aforementioned predetermined spacing between the light diffusion layer 122 and the light-shielding pattern layer 121, an excellent balance between the light diffusion effect and the icon definition can be achieved, which shows advantages in design.

The following table is the actual test data table of different portions of different embodiments A to D of the decorative film 110.

| | Thickness (μm) | Optical density | Trans-mittance (T %) | Haze Front (printed side) | Haze Back (non-printed side) |
|---|---|---|---|---|---|
| Embodiment A | 500 | 1.51 | 2.385 | 9.23 (Glossy) | 9.3 |
| | | 1.52 | 2.396 | 9.34 | 9.46 |
| | | 1.53 | 2.373 | 9.19 | 9.22 |
| Embodiment B | 210 | 1.61 | 0.09 | 93.4 (coarse texture) | 92.3 |
| | | 1.64 | 0.096 | 94.2 | 92.7 |
| | | 1.64 | 0.094 | 95.1 | 94.6 |
| Embodiment C | 130 | 0.37 | 20.106 | 35.4 (fine texture) | 35.3 |
| | | 0.38 | 19.989 | 35.1 | 35.3 |
| | | 0.38 | 19.355 | 35.4 | 34.9 |
| Embodiment D | 420 | 1.31 | 0.615 | 74.8 | 73.5 |
| | | 1.29 | 0.639 | 75.3 | 75.5 |
| | | 1.28 | 0.613 | 72.6 | 72 |

In some embodiments, the light diffusion layer 122 is a printing ink layer that can be printed by a printing process, but the present disclosure is not limited in this regard. In this way, the thickness and manufacturing process of the automotive decorative panel 100 can be reduced.

In some embodiments, in design practice, the substrate 111 of the decorative film 110 has a thickness smaller than 250 μm. If the thickness of the substrate 111 is greater than 250 μm, the decorative film 110 is easy to debond and separate.

In some embodiments, in terms of design options, the light source system 130 has a luminous intensity between 22.5 cd/m² and 1000 cd/m². If the luminous intensity of the light source system 130 is smaller than 22.5 cd/m², the illuminance of the light source system 130 will be insufficient, that is, the icons in FIG. 3 may not be clearly displayed. If the luminous intensity of the light source system 130 is greater than 22.5 cd/m², the illuminance of the light source system 130 will be too strong and cause discomfort to human eyes. From this we can see that, by making the luminous intensity of the light source system 130 fall within the aforementioned predetermined range, an excellent balance can be achieved between icon definition and visual comfort, which shows advantages in design.

In some embodiments, in design practice, the light-shielding pattern layer 120 has a thickness between 8 μm and 30 μm. If the thickness of the light-shielding pattern layer 121 is smaller than 8 μm, the shielding property of the light-shielding pattern layer 121 will be insufficient. If the thickness of the light-shielding pattern layer 121 is greater than 30 μm, the light-shielding pattern layer 121 is likely to generate air bubbles in the subsequent bonding process.

In some embodiments, the light-shielding pattern layer 121 is a printing ink layer that can be printed by a printing process, but the present disclosure is not limited in this regard. In this way, the thickness and manufacturing process of the automotive decorative panel 100 can be reduced.

In some embodiments, the pattern area 121*a* of the light-shielding pattern layer 121 has a width between 0.15 mm and 5 mm. If the width of the pattern area 121*a* is smaller than 0.15 mm, it will be difficult to manufacture the light-shielding pattern layer 121 by screen printing technology, which will easily cause problems such as screen blockage, ink leakage, ink overflow, or pattern blurring. If the width of the pattern area 121*a* is greater than 5 mm, the appearance effect will be poor (that is, the pattern is ugly).

Figure 4:
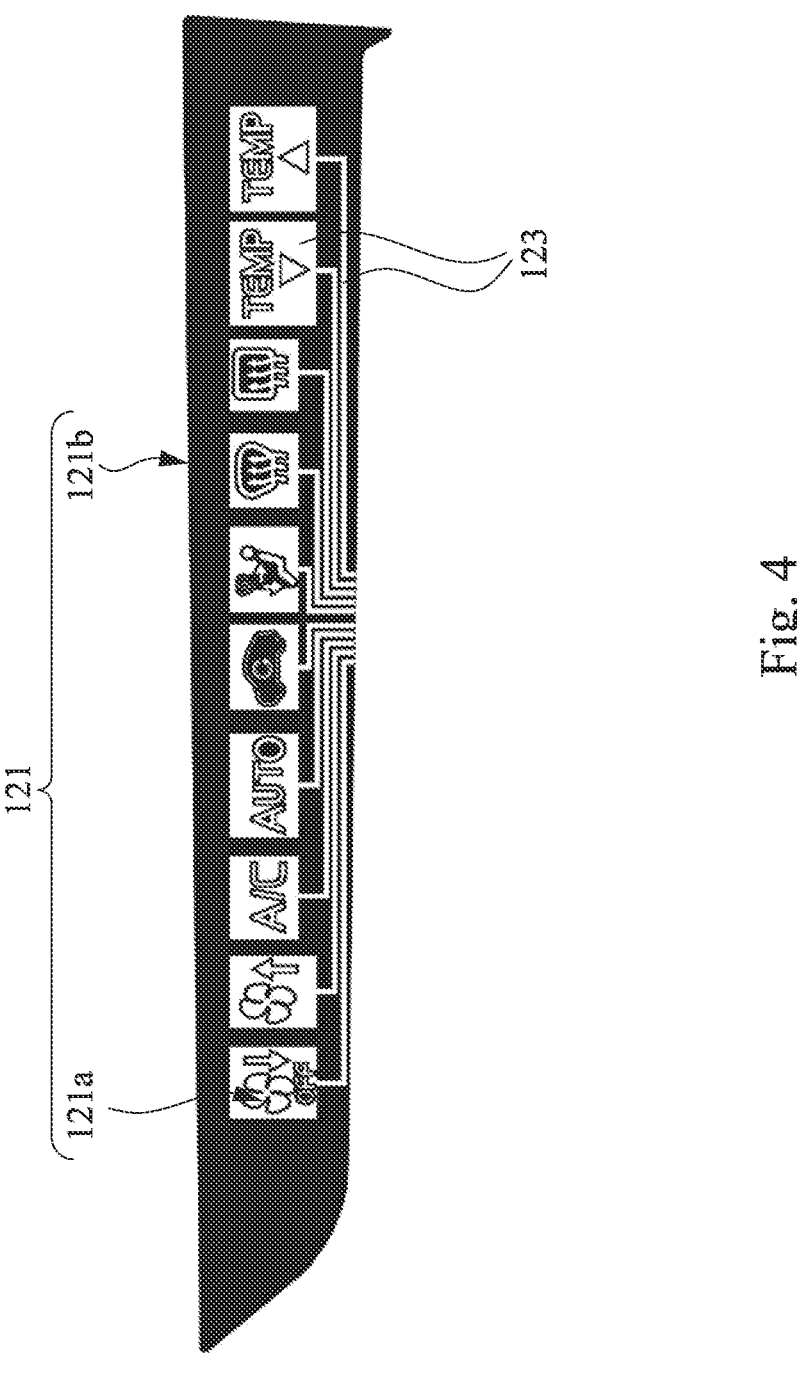
FIG. 4 is a front view of a light-shielding pattern layer and a touch layer according to an embodiment of the present disclosure.

Reference is made to FIG. 4. FIG. 4 is a front view of the light-shielding pattern layer 121 and the touch layer 123 according to an embodiment of the present disclosure. As shown in FIG. 4, in the present embodiment, as mentioned above, the peripheral area 121*b* of the light-shielding pattern layer 121 that is light-impermeable surrounds a plurality of the pattern areas 121*a* that are light-permeable. Each of the pattern areas 121*a* corresponds to an icon. The touch layer 123 is disposed on the peripheral area 121*b* and surrounds the pattern areas 121*a* separately. Specifically, the touch layer 123 includes a plurality of touch lines. The touch lines separately surround the pattern areas 121*a* (that is, each of the touch lines corresponds to one of the pattern areas 121*a*). Therefore, when the user touches one of the pattern areas 121*a*, the corresponding touch line can be sensed to generate a touch signal.

As shown in FIG. 1, in some embodiments, the light source system 130 includes a cover plate 131 and a circuit board 132. The automotive decorative panel 100 further includes an adhesive layer 140 and a flexible circuit board 150. The cover plate 131 is bonded to the light diffusion layer 122 of the touch icon component 120 through the adhesive layer 140. The circuit board 132 is disposed on a side of the cover plate 131 away from the touch icon component 120. A processor (not shown) and a light-emitting module (not shown) are disposed on the circuit board 132. The light-emitting module includes a plurality of light-emitting units (such as light-emitting diodes). The flexible circuit board 150 is connected to the touch layer 123 and the circuit board 132 of the light source system 130 and is configured to transmit touch signals generated by the touch layer 123 to the circuit board 132. The processor can make the corresponding light-emitting unit emit light according to the touch signal, so as to make the corresponding icon emit light.

In some embodiments, the adhesive layer 140 can be a double-sided tape, a pressure sensitive adhesive (PSA), or an optically clear adhesive (OCA), but the disclosure is not limited in this regard.

In some embodiments, a material of the cover plate 131 includes plastic. The plastic includes, for example, polycarbonate (PC), but the disclosure is not limited in this regard.

In some embodiments, the touch layer 123 includes lines that can be printed by a printing process, such as printing conductive silver paste. In this way, the thickness and manufacturing process of the automotive decorative panel 100 can be reduced. In some embodiments, the touch layer 123 includes conductive silver paste lines. In other embodiments, a material of the touch layer 123 includes conductive polymer. In some embodiments, the conductive polymer is poly(3,4-ethylenedioxythiophene) polystyrene sulfonate (PEDOT:PSS), but the disclosure is not limited in this regard. In this way, the touch layer 123 is stretchable.

As shown in FIG. 1, in the present embodiment, the spacing between the light diffusion layer 122 and the light-shielding pattern layer 121 is greater than 0, but the disclosure is not limited in this regard.

Figure 5:
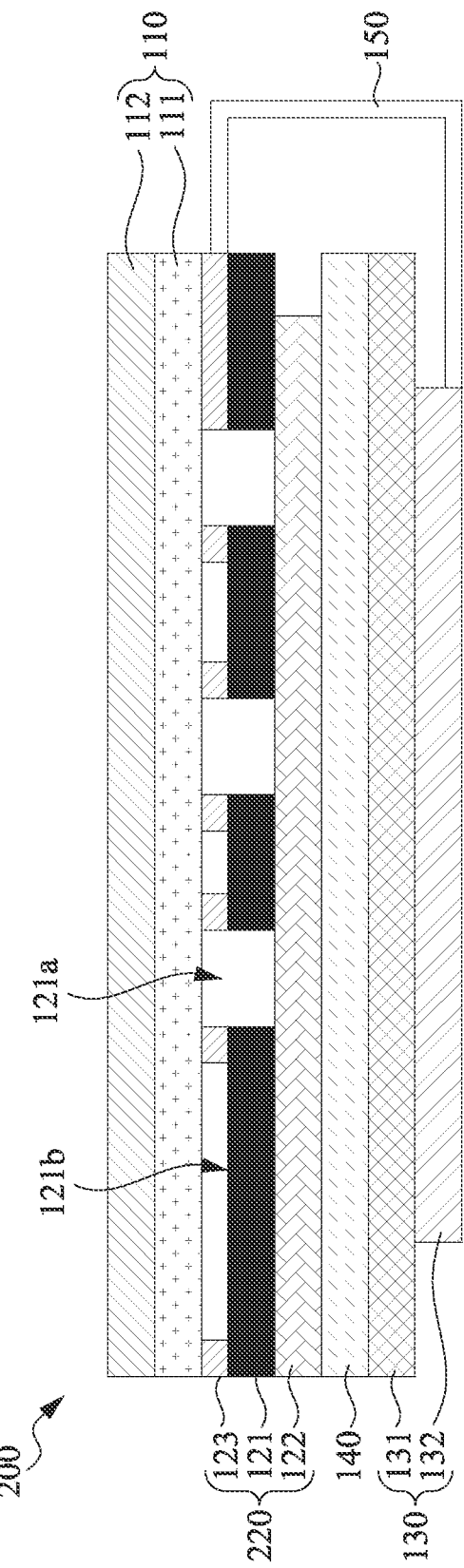
FIG. 5 is a cross-sectional view of an automotive decorative panel according to another embodiment of the present disclosure.

Reference is made to FIG. 5. FIG. 5 is a cross-sectional view of an automotive decorative panel 200 according to another embodiment of the present disclosure. As shown in FIG. 5, in the present embodiment, the automotive decorative panel 200 includes a decorative film 110, a touch icon component 220, a light source system 130, an adhesive layer 140, and the flexible circuit board 150, in which the decorative film 110, the light source system 130, the adhesive layer 140, and the flexible circuit board 150 are the same as or similar to those of the embodiment shown in FIG. 1, so the relevant descriptions of these components can be referenced above and will not be repeated here. Compared with the embodiment shown in FIG. 1, the present embodiment proposes a modified touch icon component 220.

Specifically, the touch icon component 220 includes a light-shielding pattern layer 121, a light diffusion layer 122, and a touch layer 123. The light-shielding pattern layer 121 has a pattern area 121*a* that is light-permeable and a peripheral area 121*b* that surrounds the pattern area 121*a* and is light-impermeable. The light diffusion layer 122 is disposed under the light-shielding pattern layer 121. The touch layer 123 is disposed between the decorative film 110 and the light-shielding pattern layer 121. The light diffusion layer 122 is disposed on a side of the light-shielding pattern layer 121 away from the touch layer 123. It can be seen that, in the present embodiment, in terms of design optimization, the light diffusion layer 122 and the light-shielding pattern layer 121 are attached to each other (that is, the spacing between them is 0).

Figure 6:
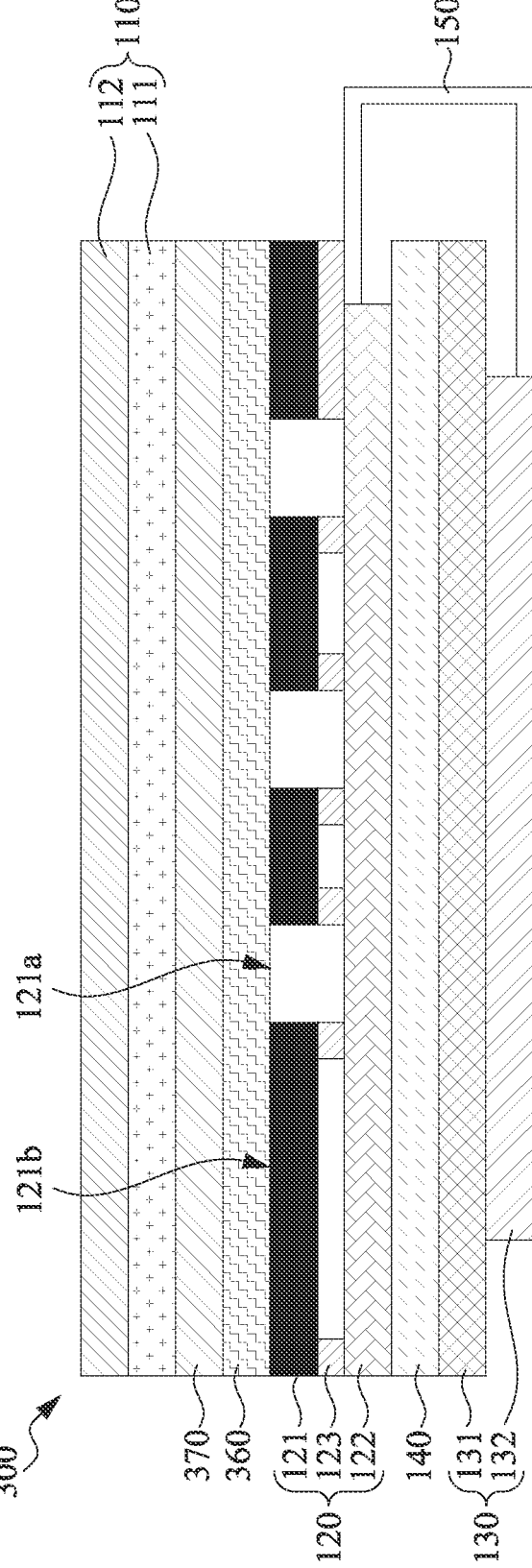
FIG. 6 is a cross-sectional view of an automotive decorative panel according to another embodiment of the present disclosure.

Reference is made to FIG. 6. FIG. 6 is a cross-sectional view of an automotive decorative panel 300 according to another embodiment of the present disclosure. As shown in FIG. 6, in the present embodiment, the automotive decorative panel 300 includes a decorative film 110, a touch icon component 120, a light source system 130, an adhesive layer 140, and the flexible circuit board 150, in which these components are the same as or similar to those of the embodiment shown in FIG. 1, so the relevant descriptions of these components can be referenced above and will not be repeated here. Compared with the embodiment shown in FIG. 1, the automotive decorative panel 300 of the present embodiment further includes a supporting layer 360 and an adhesive layer 370. The supporting layer 360 is bonded to the substrate 111 of the decorative film 110 through the adhesive layer 370, and the touch icon component 120 is disposed on a side of the supporting layer 360 away from the decorative film 110. In this way, the automotive decorative panel 300 of the present embodiment can further increase the structural strength through the supporting layer 360.

In some embodiments, a material of the supporting layer 360 includes plastic. The plastic includes PET, for example, but the present disclosure is not limited in this regard.

The adhesive layer 370 can be double-sided tape, PSA, or OCA, but the present disclosure is not limited in this regard.

According to the foregoing recitations of the embodiments of the disclosure, it can be seen that in the automotive decorative panel of the present disclosure, by making the optical density of the decorative film fall within a predetermined range, sufficient shielding and light-transmitting properties of the automotive decorative panel can be ensured. By making the optical density of the light-shielding pattern layer of the touch icon component greater than the optical density of the decorative film, it is possible to ensure sufficient clarity of the icons presented on the automotive decorative panel. By making the light diffusion layer of the touch icon component have a predetermined thickness and maintaining a predetermined spacing between the light diffusion layer and the light-shielding pattern layer, an excellent balance can be achieved between the light diffusion effect and icon definition.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An automotive decorative panel, comprising:
    a decorative film comprising a substrate and a decorative layer disposed on the substrate, the decorative film having an optical density between 0.2 and 2.0;
    a touch icon component disposed under the decorative film and comprising:
        a light-shielding pattern layer having an optical density between 3.5 and 6.0, the light-shielding pattern layer having a plurality of pattern areas that are light-permeable and a peripheral area that surrounds the plurality of pattern areas and is light-impermeable;
        a light diffusion layer disposed under the light-shielding pattern layer and having a thickness between 10 μm and 30 μm, a spacing between the light diffusion layer and the light-shielding pattern layer being between 0 and 1.0 mm; and
        a touch layer disposed on a side of the light-shielding pattern layer away from the decorative film or between the decorative film and the light-shielding pattern layer, wherein the touch layer comprises a plurality of touch lines, each of the plurality of touch lines disposed adjacent the peripheral area of the light-shielding pattern layer and surrounding one of the plurality of pattern areas of the light-shielding pattern layer; and
    a light source system disposed on a side of the touch icon component away from the decorative film and configured to emit light toward the touch icon component.

2. The automotive decorative panel of claim 1, wherein the light source system has a luminous intensity between 22.5 cd/m² and 1000 cd/m².

3. The automotive decorative panel of claim 1, wherein the substrate has a thickness smaller than 250 μm.

4. The automotive decorative panel of claim 1, wherein the light-shielding pattern layer has a thickness between 8 μm and 30 μm.

5. The automotive decorative panel of claim 1, wherein each of the plurality of pattern areas has a width between 0.15 mm and 5 mm.

6. The automotive decorative panel of claim 1, further comprising a flexible circuit board connected to the touch layer and the light source system.

7. The automotive decorative panel of claim 1, wherein the light-shielding pattern layer is a printing ink layer.

8. The automotive decorative panel of claim 1, wherein a material of the touch layer comprises conductive polymer.

9. The automotive decorative panel of claim 8, wherein the conductive polymer is poly(3,4-ethylenedioxythio-phene) polystyrene sulfonate (PEDOT:PSS).

10. The automotive decorative panel of claim 1, further comprising a supporting layer disposed between the decorative film and the touch icon component.

11. The automotive decorative panel of claim 1, wherein a sidewall of the peripheral area of the light-shielding pattern layer facing the one of the plurality of pattern areas is coplanar with a sidewall of one of the plurality of touch lines surrounding the one of the plurality of pattern areas.

12. The automotive decorative panel of claim 1, wherein the one of the plurality of pattern areas is defined by a first sidewall of one of the plurality of touch lines and a first sidewall of the peripheral area of the light-shielding pattern layer.

13. The automotive decorative panel of claim 12, wherein the one of the plurality of pattern areas is further defined by a second sidewall of the one of the plurality of touch lines and a second sidewall of the peripheral area of the light-shielding pattern layer.

14. The automotive decorative panel of claim 12, wherein the one of the plurality of pattern areas is further defined by the light diffusion layer.

15. The automotive decorative panel of claim 14, wherein the one of the plurality of pattern areas is further defined by the substrate.

16. The automotive decorative panel of claim 12, wherein the one of the plurality of pattern areas is further defined by the substrate.

17. The automotive decorative panel of claim 12, wherein the first sidewall of the one of the plurality of touch lines and the first sidewall of the peripheral area of the light-shielding pattern layer are coplanar.

18. The automotive decorative panel of claim 1, wherein the plurality of touch lines overlie the peripheral area of the light-shielding pattern layer.

19. The automotive decorative panel of claim 1, wherein the plurality of touch lines underlie the peripheral area of the light-shielding pattern layer.

20. The automotive decorative panel of claim 1, a top of each of the plurality of pattern areas is defined by the substrate.

* * * * *